(12) United States Patent
Nguyen et al.

(10) Patent No.: US 7,773,339 B2
(45) Date of Patent: Aug. 10, 2010

(54) METHOD AND APPARATUS FOR A DISK CLAMP USED IN A HARD DISK DRIVE THAT REDUCES MECHANICAL DEFORMATION ON AT LEAST ONE DISK FROM TIGHTENED SCREWS THROUGH THE DISK CLAMP

(75) Inventors: Tu Nguyen, San Jose, CA (US); Tho Pham, Milpitas, CA (US); Myeong-Eop Kim, Sunnyvale, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1036 days.

(21) Appl. No.: 11/502,020

(22) Filed: Aug. 9, 2006

(65) Prior Publication Data

US 2008/0037165 A1 Feb. 14, 2008

(51) Int. Cl.
*G11B 17/02* (2006.01)

(52) U.S. Cl. .................................. 360/99.12; 360/98.08
(58) Field of Classification Search .............. 360/98.08, 360/99.08, 99.12
See application file for complete search history.

(56) References Cited

U.S. PATENT DOCUMENTS

| 5,333,080 | A | * | 7/1994 | Ridinger et al. | .......... 360/99.12 |
| 5,912,784 | A | * | 6/1999 | Bronshvatch et al. | .... 360/98.08 |
| 6,212,030 | B1 | * | 4/2001 | Koriyama et al. | ........ 360/98.08 |

\* cited by examiner

*Primary Examiner*—A. J. Heinz
(74) *Attorney, Agent, or Firm*—GSS Law Group (57) ABSTRACT

Disk clamp including a disk clamp base and a disk clamp platform. Disk pack including at least one disk coupled between disk clamp and spindle motor. Hard disk drive including disk pack mounted on disk base. Manufacturing methods for disk clamp base, disk clamp platform, disk pack and hard disk drive, and these items as products of their manufacturing processes.

20 Claims, 12 Drawing Sheets

METHOD AND APPARATUS FOR A DISK CLAMP USED IN A HARD DISK DRIVE THAT REDUCES MECHANICAL DEFORMATION ON AT LEAST ONE DISK FROM TIGHTENED SCREWS THROUGH THE DISK CLAMP

TECHNICAL FIELD

This invention relates to the disk clamps used in a hard disk drive, in particular disk clamps limiting their distortion of the disks due to stresses from the clamping.

BACKGROUND OF THE INVENTION

The hard disk drive typically includes a disk pack, which in turn includes a disk clamp coupling at least one disk to a spindle motor. The hard disk drive includes a head stack assembly pivoting through an actuator pivot to position one or more read-write heads, embedded in sliders, each over a rotating disk surface of one of the disks being rotated by the spindle motor. The data stored on the disk surface is typically arranged in concentric tracks. To access the data of a track, a read-write head is positioned by electrically stimulating the voice coil motor, which couples through the voice coil and an actuator arm to move a head gimbal assembly in positioning the slider close to the track.

There is a problem with this situation. Today's hard disk drives often fly the slider a very short distance off the rotating disk surface, often within 10 nanometers. This is small enough that the mechanical stress used to tighten the screws of the disk clamp deforms the disks, causing track mis-registration, impairing the ability to follow the track. A disk clamp is needed which can reduce and/or eliminate this problem.

SUMMARY OF THE INVENTION

The invention's disk clamp includes a disk clamp base and a disk clamp platform, which are to be used in a hard disk drive. The disk clamp base includes N first screw holes proceeding from a first clamping surface to a second clamping surface. The first clamping surface is for contacting a disk surface included in a disk and the second clamping surface is for contacting the disk clamp platform. The disk clamp platform includes N second screw holes proceeding from a first platform surface to a second platform surface. The first platform surface is for contacting the second clamping surface and the second platform surface is for contacting the N screws, where N is at least four. In certain embodiments, N may be at least six. A version of this disk clamp was compared with a standard prior art disk clamp in a mechanical simulation environment and shown to provide a fraction of the deviation in the disk surface as the prior art disk clamp.

The invention's disk clamp base may be primarily composed of a first metal and the first metal may preferably be a form of aluminum. The disk clamp base may be manufactured by forming the first metal to create the disk clamp base. Forming the first metal may include one or more of molding the first metal, stamping the first metal and/or machining the first metal to create the disk clamp base. The invention further includes the disk clamp base as a product of the invention's manufacturing process. The disk clamp base may further include a tab ramp for a contact start-stop mechanism in the hard disk drive.

The invention's disk clamp platform may be primarily composed of a second metal and the second metal may preferably be a form of stainless steel. The disk clamp platform may be manufactured by forming the second metal to create the disk clamp platform. Forming the second metal may include one or more of molding the second metal, stamping the second metal and/or machining the second metal to create the disk clamp platform. The invention further includes the disk clamp platform as a product of the invention's manufacturing process.

The invention's disk pack may preferably include the disk coupled between the disk clamp and a spindle motor by N screws. The first clamping surface is preferably in contact with the rotating disk surface. The second clamping surface is preferably in contact with the first platform surface. The second platform surface may preferably be in contact with the head of each of the screws. The disk pack may include more than one disk, for example, it may include a second disk coupling through a disk spacer to the disk, where the second disk is also coupled between the disk clamp and the spindle motor.

The disk pack may be manufactured by coupling the disk between the disk clamp and the spindle motor by the N of the screws to create the disk pack. Manufacturing may further include balancing the disk pack using at least one of M plug holes in each of the disk clamp base and the disk clamp platform to further create the disk pack, where M is at least four. The plug holes in the disk clamp base may be wider than those holes in the disk clamp platform to preferably minimize stress on the disks being clamped. The disk pack is a product of the invention's manufacturing process.

The invention's hard disk drive includes the disk pack mounted to a disk base. The hard disk drive may implement an outside diameter parking ramp or a contact start-stop mechanism. Manufacturing the hard disk drive preferably includes mounting the disk pack to the disk base to create the hard disk drive. The hard disk drive is a product of this manufacturing process.

BRIEF DESCRIPTION OF THE DRAWINGS

FIGS. 6A to 7C show some details of a contact start-stop mechanism using the disk clamp in the hard disk drive.

DETAILED DESCRIPTION

This invention relates to the disk clamps used in a hard disk drive, in particular disk clamps limiting their distortion of the disks due to stresses from the clamping.

Figure 1A:
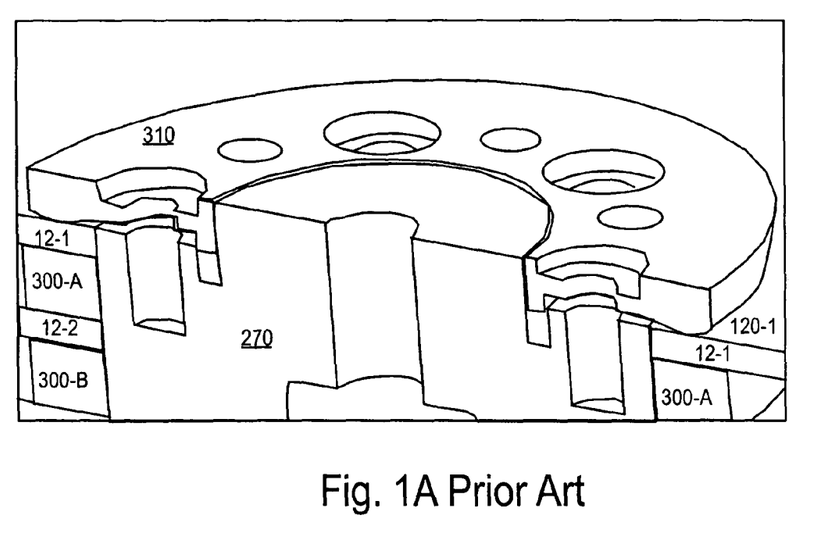
FIG. 1A shows a prior art disk clamp.
Figure 1B:
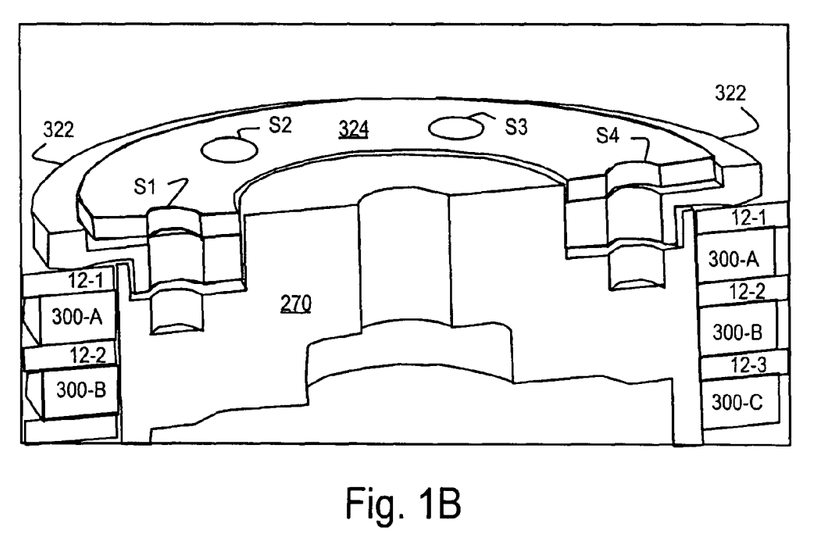
FIGS. 1B to 1F show various aspects of the invention's disk clamp including a disk clamp base and disk clamp platform.
Figure 3A:
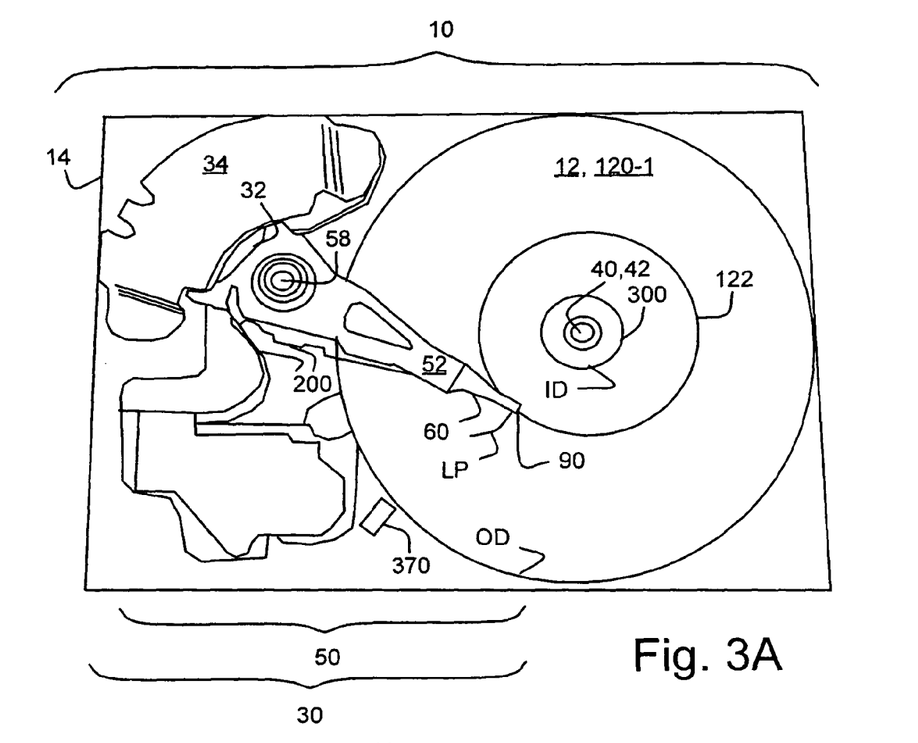
FIGS. 3A and 3B show some details of the invention's hard disk drive.
Figure 3B:
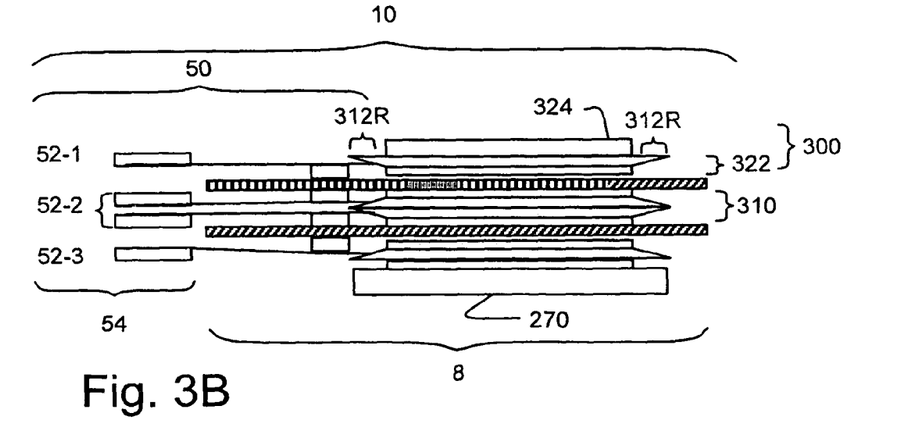
Figure 5:
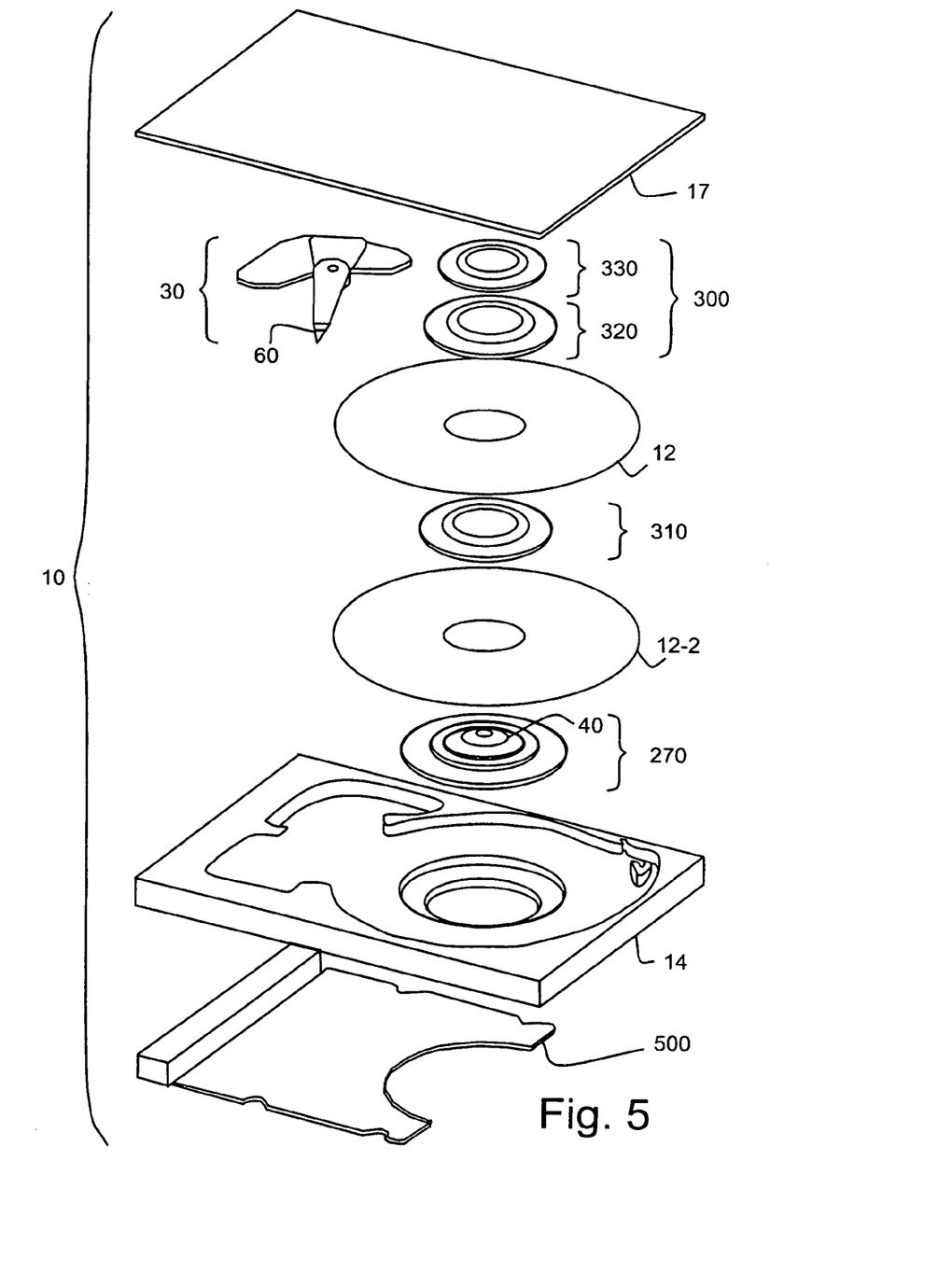
FIG. 5 shows some additional details of the invention's hard disk drive.
Figure 6A:
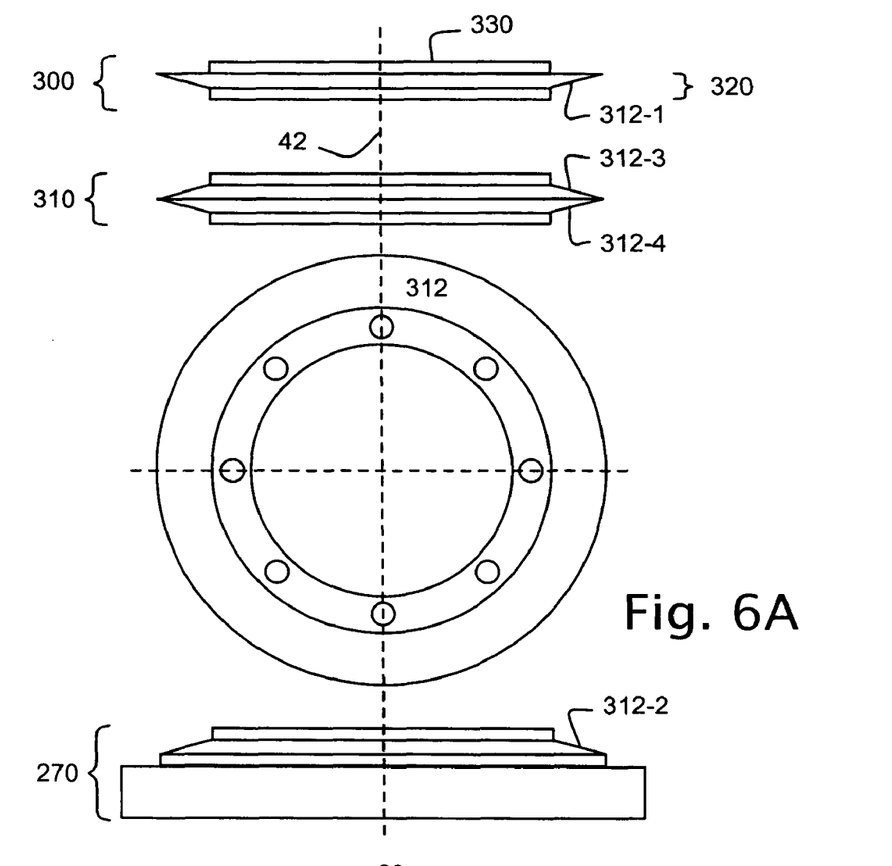
Figure 6B:
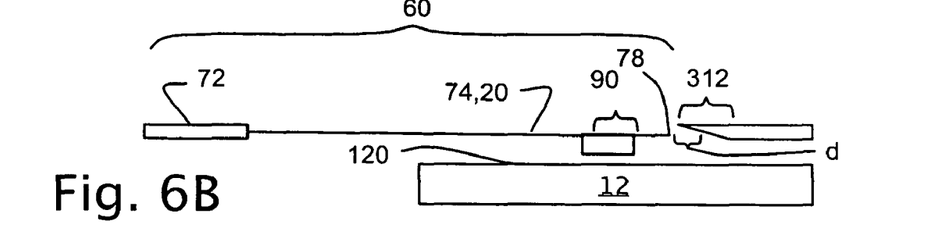

The invention's disk clamp 300 includes a disk clamp base 320 and a disk clamp platform 330 as shown in FIGS. 1B to 1F, are to be used in a hard disk drive 10 as shown in FIGS. 3A, 3B, 5 in a disk pack 8 of FIGS. 3A, 3B, 5 and 8 further shown in various details with a spindle motor 270 in FIG. 6A, and with at least one head stack assembly 60 shown through FIGS. 6A to 7C. The disk clamp base includes N first screw holes proceeding from a first clamping surface 322 to a second clamping surface 324. The first clamping surface is for contacting a disk surface 120-1 which is part of the upper surface of a disk and the second clamping surface is for contacting the disk clamp platform. The disk clamp base includes an upstanding abutment 320-1 which forms a cavity in an upper surface of said disk clamp base for positioning said disk clamp platform as shown in FIG. 1B. The disk clamp platform includes N second screw holes proceeding from a first platform surface 332 to a second platform surface 334. The first platform surface is for contacting the second clamping surface and the second platform surface is for contacting the N screws, where N is at least four. In certain embodiments, N may be at least six. The screw holes are labeled S1 to S4 in these Figures.

Figure 2A:
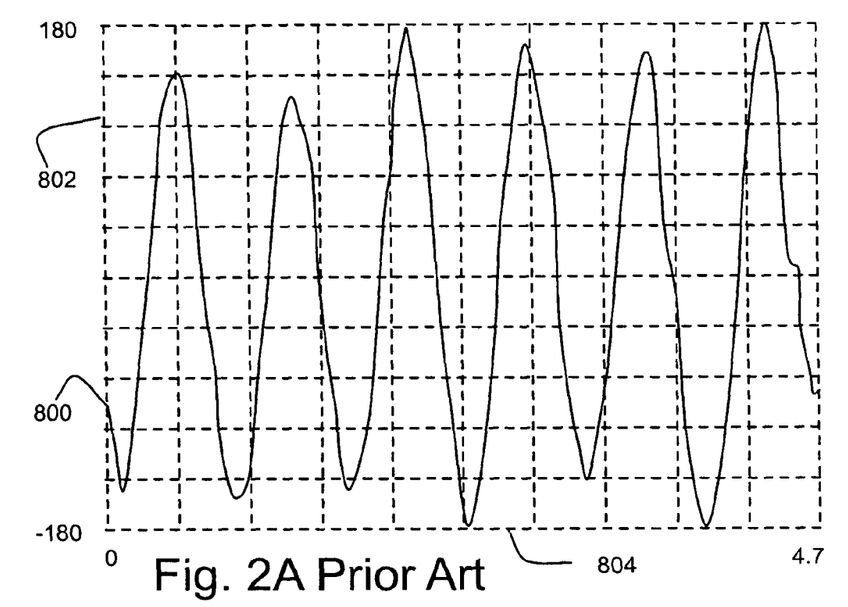
FIG. 2A shows the distortion of a disk using the prior art disk clamp of FIG. 1A.
Figure 2B:
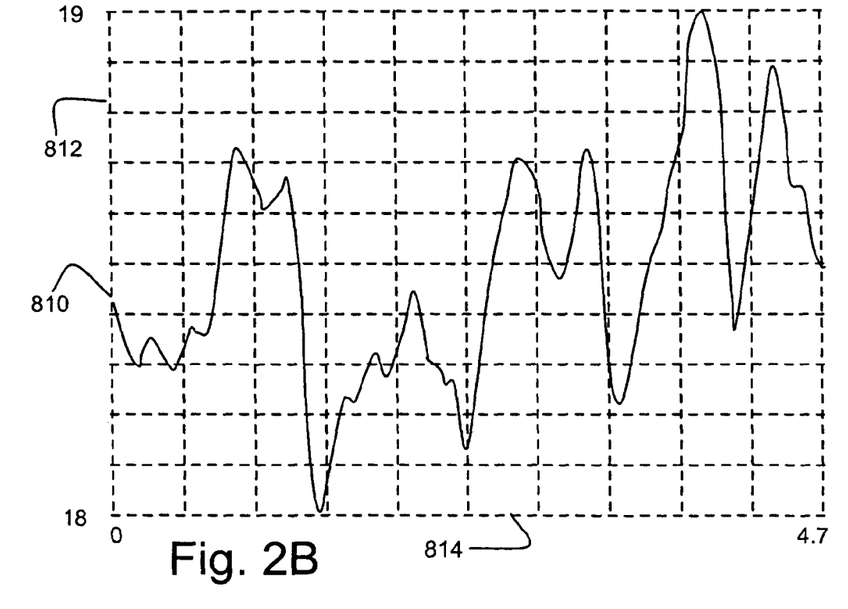
FIG. 2B shows the distortion of a disk using the invention's disk clamp of FIG. 1B.
Figure 7A:
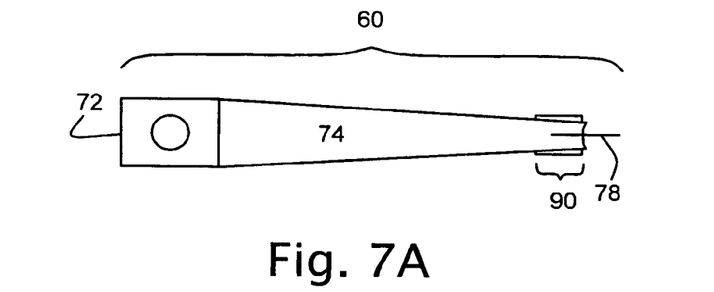
Figure 7B:
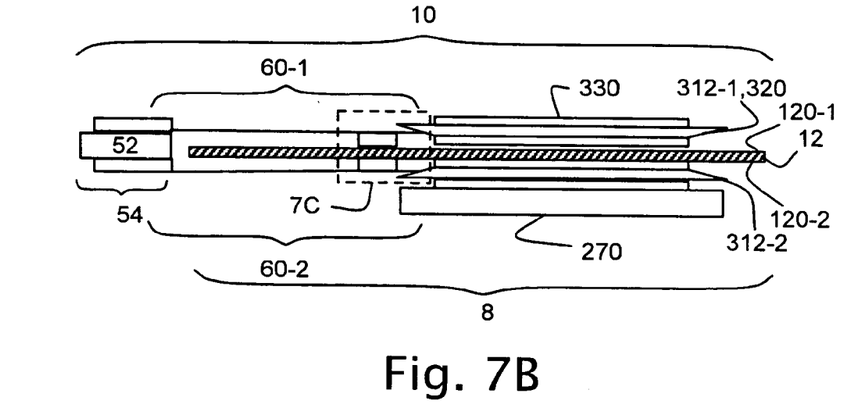

A version of this disk clamp 300 as shown in FIG. 1B was compared with a standard prior art disk clamp as shown in FIG. 1A in a mechanical simulation environment and shown to provide a fraction of the deviation in the disk surface as the prior art disk clamp. FIG. 2A shows the distortion of the disk surface 120-1 and consequently the disk 12 as the disk was rotated in a disk pack 8 containing the single disk as shown in FIG. 7B. FIG. 2B shows the same configuration using the invention's disk clamp. The vertical axis 802 and the vertical axis 812 both measure acceleration in inches per second per second, with the significant difference in scale. In FIG. 2A, the prior art shows a maximum distortion of 180 in/sec/sec, whereas the invention shows a maximum distortion of 19 in/sec/sec. The horizontal axis 804 of FIG. 2A and the horizontal axis of FIG. 2B have the same scale roughly the radial distance along the outside diameter OD of a disk in a 3.5 inch hard disk drive.

Figure 1C:
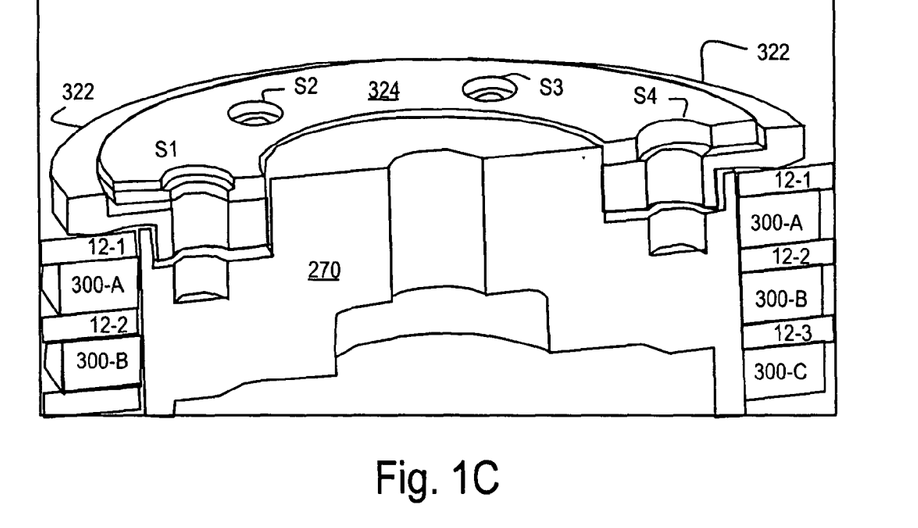
Figure 1D:
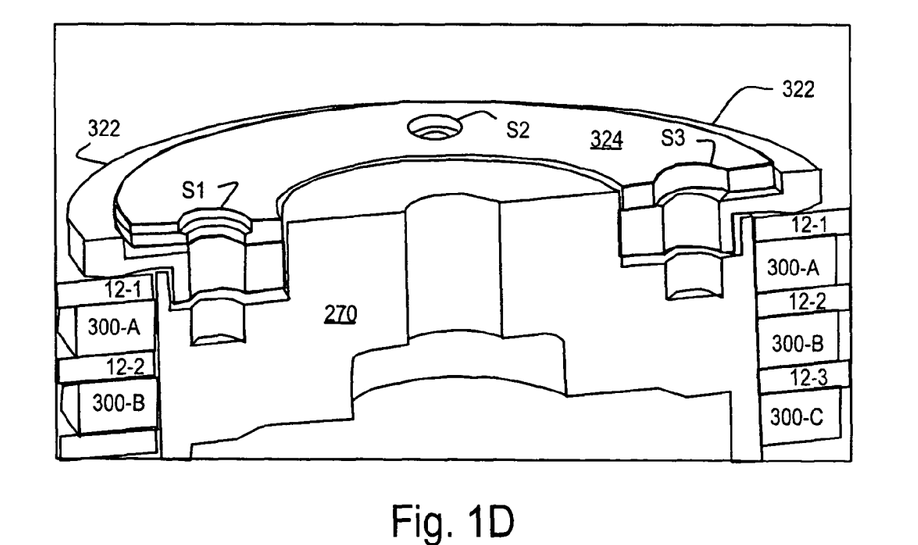
Figure 1E:
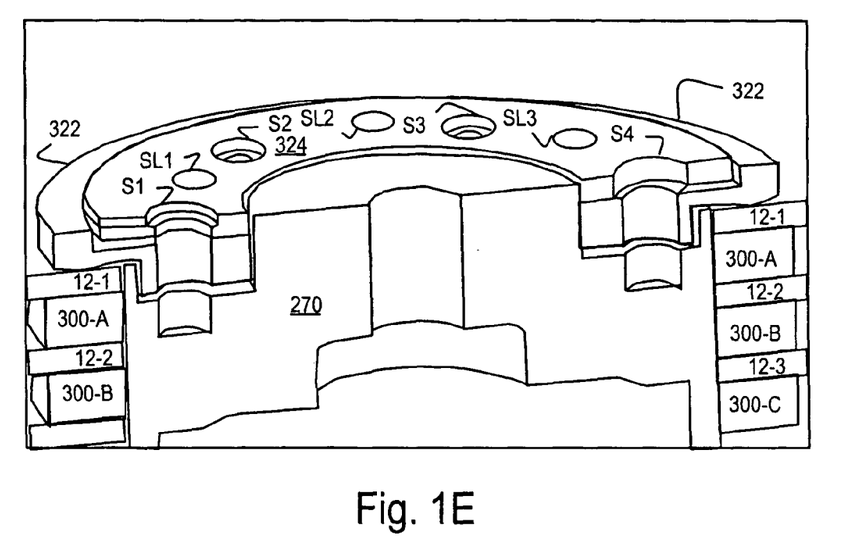
Figure 1F:
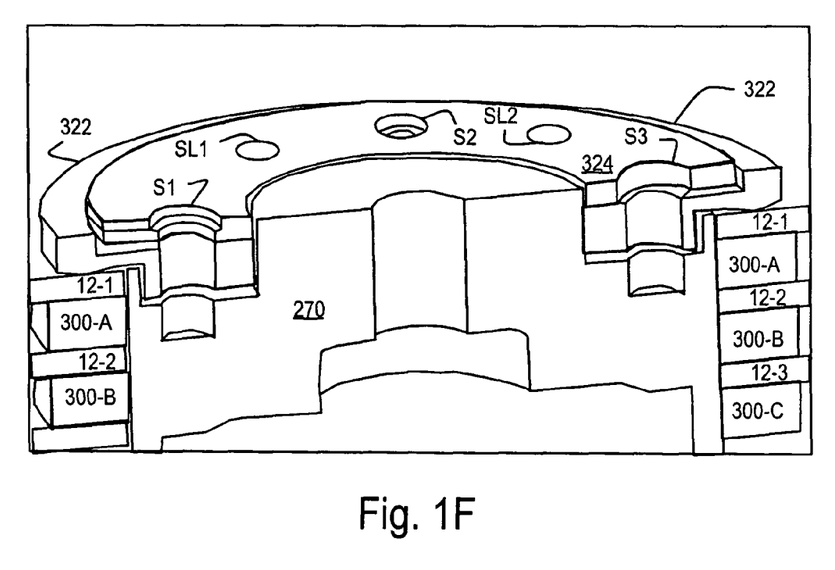
Figure 8:
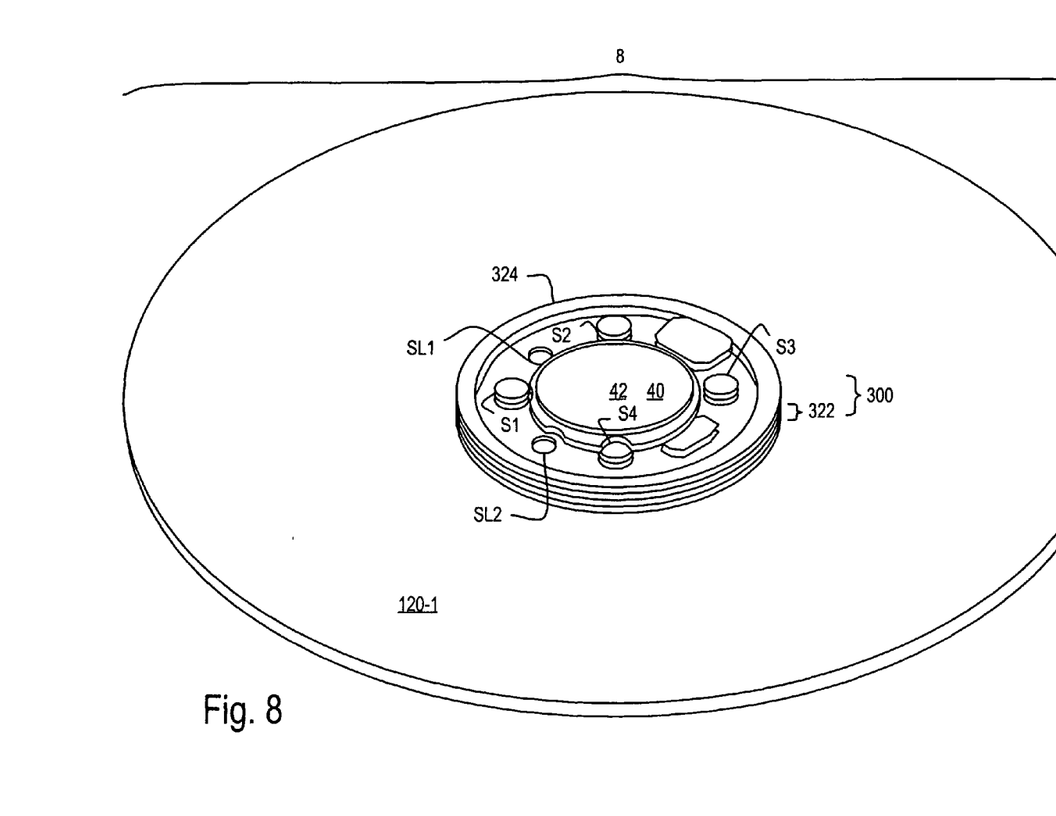
FIGS. 8 to 10 show some details of the manufacturing of the invention's disk pack and the hard disk drive.

Further examples of the disk clamp 300 include FIG. 1C showing the screw holes being recessed to lower the profile of the screws when the hard disk drive 10 is assembled. FIGS. 1B, 1C and 1E show the invention's disk clamp with N=6 screw holes. FIGS. 1D, 1F, and 8 show the disk clamp with N=4 screw holes. FIGS. 1E, 1F and 8 show the disk clamp with plug holes PH1 to PH4.

The invention's disk clamp base 320 may be primarily composed of a first metal and the first metal may preferably be a form of aluminum. The disk clamp base may be manufactured by forming the first metal to create the disk clamp base. Forming the first metal may include one or more of molding the first metal, stamping the first metal and/or machining the first metal to create the disk clamp base. The invention further includes the disk clamp base as a product of the invention's manufacturing process. The disk clamp base may further include a tab ramp 312R for a contact start-stop mechanism in the hard disk drive 10, as shown in FIGS. 3B and 6A.

Figure 6C:
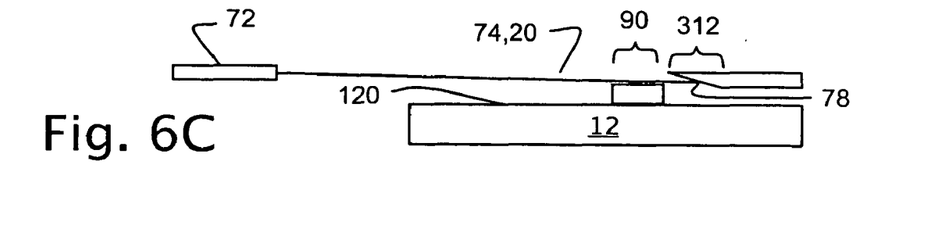
Figure 7C:
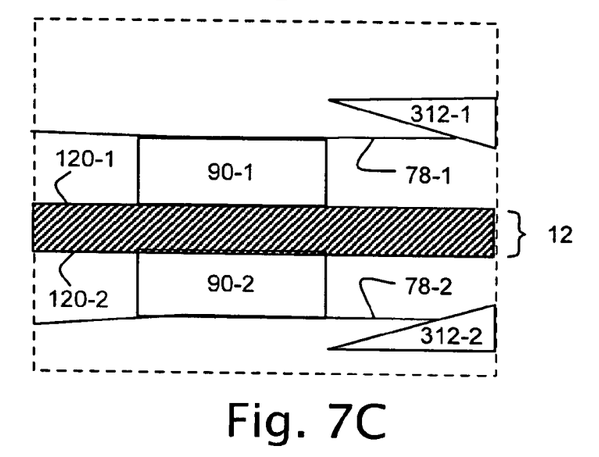

The tab ramp 312R is used in certain embodiments of the hard disk drive 10 which support a contact start-stop parking mechanism. Such a mechanism operates as follows. For each head gimbal assembly 60 included in the hard disk drive, the head gimbal assembly interacts with a tab ramp radially mounted about a spindle shaft center 42. A load tab 78 included in the head gimbal assembly shown in FIGS. 6B to 7B contacts the tab ramp to engage the slider 90 into a secure contact with a disk surface 120-1, as shown in FIGS. 6C, and 1E to 1H. The disk surface is included in a disk 12 mounted through the spindle shaft center. The disk surface may include a disk substrate of nickel-phosphorus clad aluminum. FIG. 6A shows the disk clamp 300, the disk spacer 310 and the spindle motor 270 supporting this contact start-stop parking mechanism. FIG. 7B shows the hard disk drive parking both sliders accessing the two disk surfaces of its single disk 12. FIG. 7C shows detail of FIG. 7B, with a first tab ramp 312-1 contacting a first load tab 78-1 to engage a first slider 90-1 into secure contact with the first disk surface 120-1, and a second tab ramp 312-2 contacting a second load tab 78-2 to engage a second slider 90-2 into secure contact with the second disk surface 120-2. As shown in FIG. 6A, the first tab ramp is included in the disk clamp base, and the second tab ramp is included in the spindle motor. FIG. 3B shows an example of the contact start-top mechanism using the third tab ramp 312-3 and the fourth tab ramp 312-4, both included in the disk spacer and used when the hard disk drive includes more than one disk, in the example a second disk 12-2. This example shows using the disk clamp platform, the disk spacer, and the spindle motor to provide contact with the four load tabs of the four head gimbal assemblies to engage their respective sliders into secure contact the four disk surfaces.

The invention's disk clamp platform 330 may be primarily composed of a second metal and the second metal may preferably be a form of stainless steel. The disk clamp platform may be manufactured by forming the second metal to create the disk clamp platform. Forming the second metal may include one or more of molding the second metal, stamping the second metal and/or machining the second metal to create the disk clamp platform. The invention further includes the disk clamp platform as a product of the invention's manufacturing process.

The invention's disk pack 8 may preferably include the disk 12 coupled between the disk clamp 300 and a spindle motor 270 by N screws, for example, SC1 to SC4. The first clamping surface 322 is preferably in contact with the disk surface 120-1. The second clamping surface 324 is preferably in contact with the first platform surface 332. The second platform surface 334 may preferably be in contact with the head of each of the screws. The disk pack may include more than one disk, for example, it may include a second disk 12-2 coupling through a disk spacer 310 to the disk, where the second disk is also coupled between the disk clamp and the spindle motor.

Figure 9:
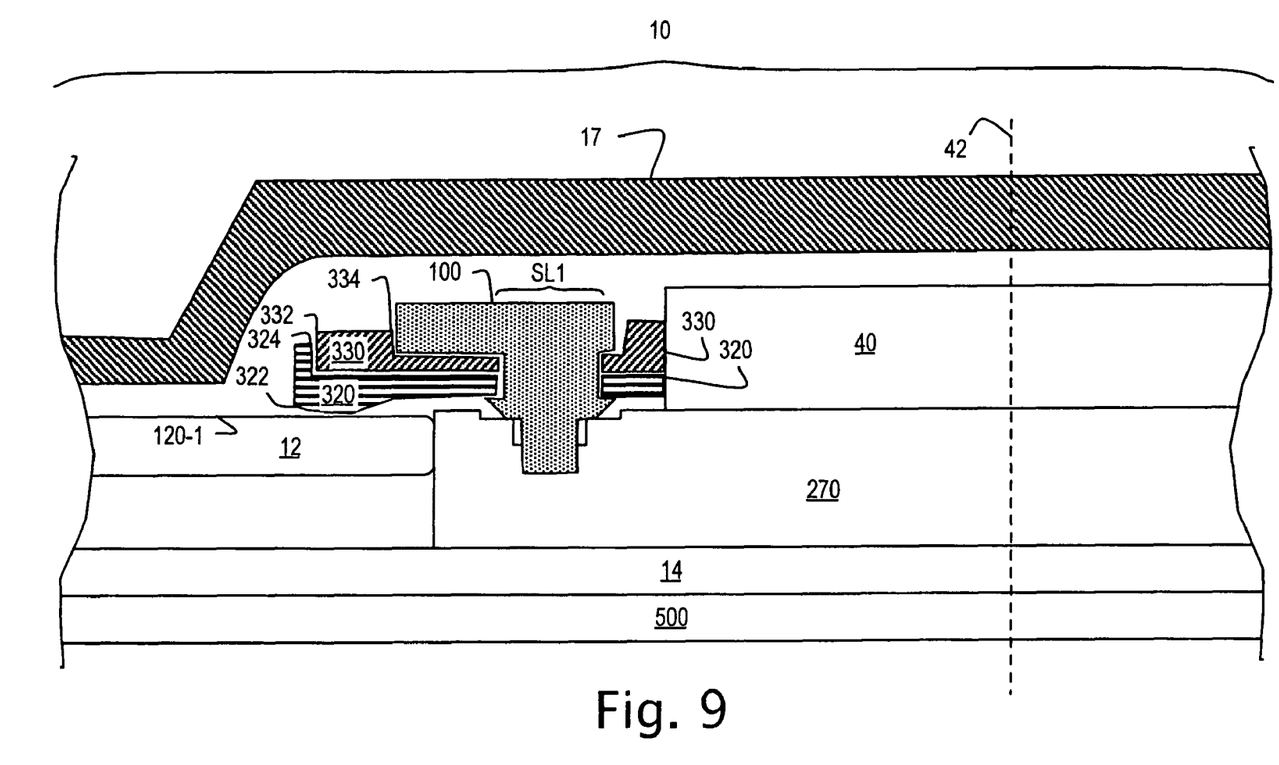
Figure 10:
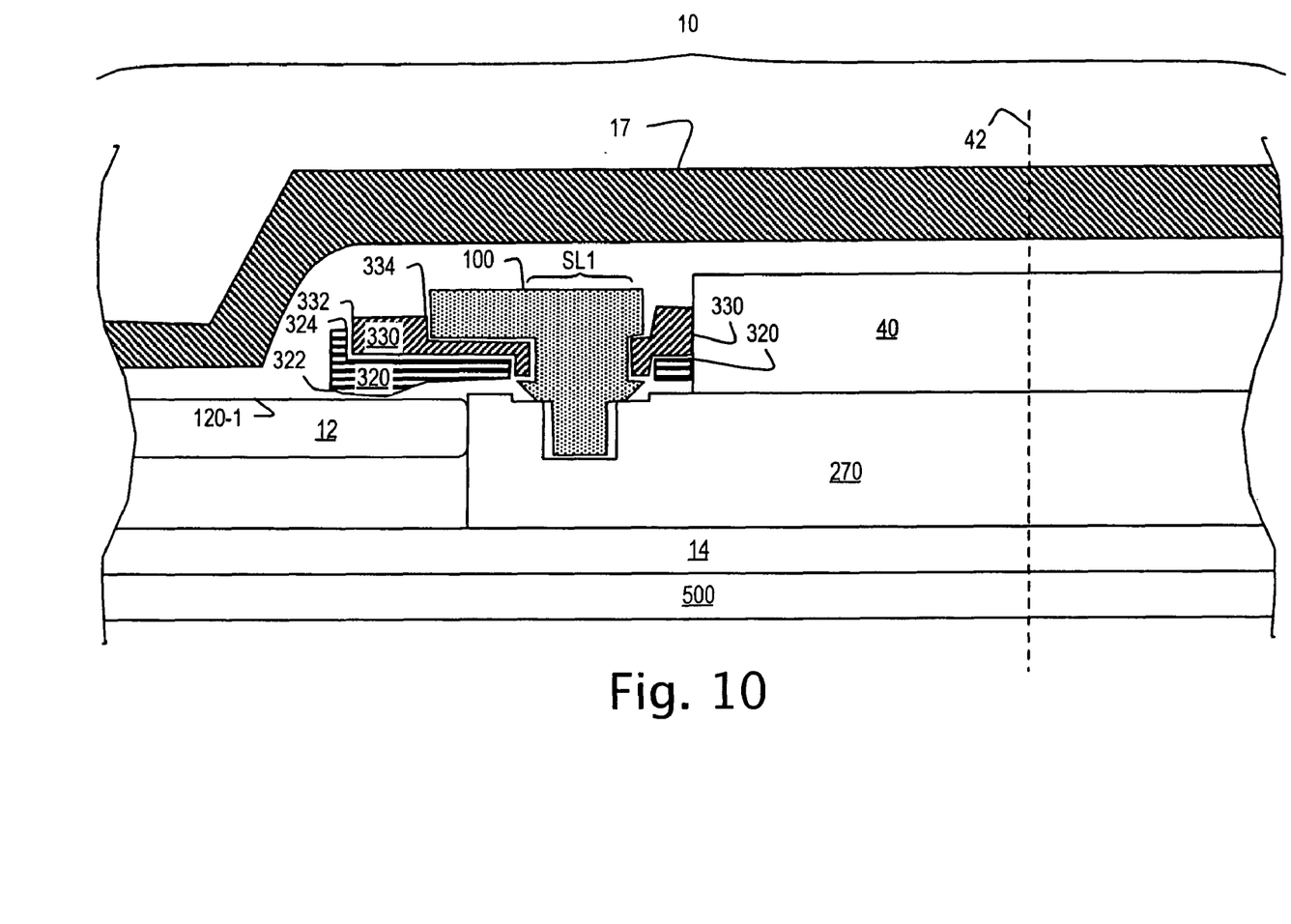

The disk pack 8 may be manufactured by coupling the disk 12 between the disk clamp 300 and the spindle motor 270 by the N screws to create the disk pack as shown in FIG. 8. Manufacturing may further include balancing the disk pack using at least one of the M plug hole PH in each of the disk clamp base 320 and the disk clamp platform 330 to further create the disk pack, where M is at least four. The plug holes in the disk clamp base may be wider than those holes in the disk clamp platform to preferably minimize stress on the disks being clamp as shown in FIG. 10. Alternatively, the plug holes may be essentially the same size, as shown in FIG. 9. The disk pack is a product of the invention's manufacturing process. FIGS. 8 to 10 show the disk pack with a counterbalance 100 inserted in one of the plug holes to balance the disk pack, as further discussed in U.S. patent application Ser. No. 10/657,587, entitled "METHOD AND APPARATUS FOR MECHANICALLY BALANCING THE DISK PACK FOR A HARD DISK DRIVE", which published as US Publication 2004-0055144, has issued as U.S. Pat. 7,064,923 and in all these forms is incorporated by reference herein.

The invention's hard disk drive 10 includes the disk pack 8 mounted to a disk base 14. The hard disk drive may implement an outside diameter parking ramp 370 as shown in FIG. 3A or a contact start-stop mechanism as shown in FIGS. 3B, 4B and 6A to 7C.

Figure 4A:
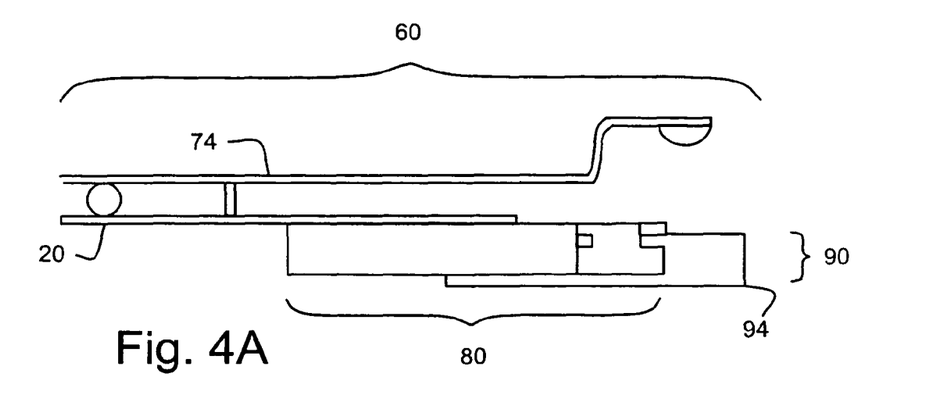
FIGS. 4A and 4B show some details of head gimbal assemblies which can be used in the invention's hard disk drive.
Figure 4B:
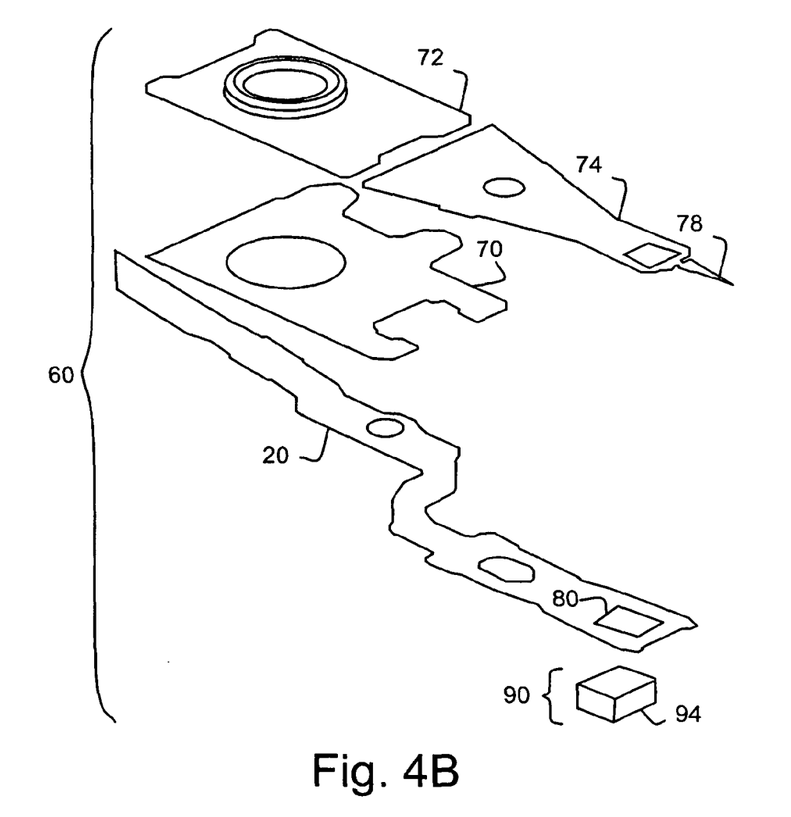

The head gimbal assembly 60 is shown in some detail in FIGS. 4A and 4B including the slider 90 coupled through a flexure finger 20 to a load beam 30, which couples through a hinge 70 to a base plate 72. The slider includes the read-write head 94, which is embedded in it, forming an air-bearing surface for flying a few nano-meters off the disk surface 120-1 during normal access operations of a track 122, which is usually arranged as a concentric circle on the disk surface in the hard disk drive 10 as shown in FIG. 4A. The head gimbal assembly may further include a micro-actuator assembly 80 coupling to the slider to aid in the lateral positioning LP of the read-write head in accessing the track. Since the slider may further include a vertical micro-actuator, which is used to provide some control of the vertical position of the slider above the disk surface. Since the vertical micro-actuator is not directly related to the actuator arms, it is not shown in these Figures. The micro-actuator assembly and/or the vertical micro-actuator may employ a thermal-mechanical effect and/or a piezoelectric effect and/or an electrostatic effect.

The hard disk drive 10 may park its slider 90 on the disk surface 120-1 as a contact start-stop (CSS) hard disk drive or on a ramp off the disks. The head gimbal assembly may include a load tab 78, which in CSS hard disk drives, may be used in contact with a tab ramp formed in a disk clamp 300, a disk spacer 310, and/or a spindle motor 270 to create a secure contact with the disk surface, as shown in FIG. 6C. The load tab may be used with the ramp off the disks as well.

Manufacturing the hard disk drive 10 preferably includes mounting the disk pack 8 to the disk base 14 to create the hard disk drive. The hard disk drive is a product of this manufacturing process. Manufacturing may further preferably include mounting the head stack assembly 50 through its actuator pivot 58 to the disk base to further create the hard disk drive.

In greater detail, the hard disk drive 10 preferably includes a head stack 54 including at least one actuator arm 52. The head stack may include more than one actuator arm. The head stack is coupled to a voice coil 32, as shown in FIG. 3A. The head stack may include exactly one actuator arm. Alternatively, the head stack may include more than one actuator arm, for example, FIG. 3B shows the head stack including a first actuator arm 52-1, a second actuator arm 52-2, and a third actuator arm 52-3.

The hard disk drive may further include a head stack assembly 50, which includes the head stack 54 coupled to at least one head gimbal assembly 60, further coupling the actuator arm 52 to at least one head gimbal assembly, for each of the actuator arms included in the head stack, as shown in FIGS. 3A, 3B, and 7B. At least one actuator arm may couple to two head gimbal assemblies.

Returning to the head stack assembly 50 includes at least one actuator arm 52, and as shown, may include additional actuator arms 52-2 and 52-3. The actuator arm 52 may couple with more than one head gimbal assembly 60. By way of example, the second actuator arm 52-2 may preferably include the second head gimbal assembly 60-2 and the third head gimbal assembly 60-3. Such an actuator arm may be preferred to minimize manufacturing expense. The second actuator arm preferably accesses two rotating disk surfaces, as shown in FIG. 4B.

The hard disk drive 10 includes the head stack assembly 50 mounted through its actuator pivot 58 to a disk base 14. The hard disk drive preferably includes a voice coil motor 30, which further includes the head stack assembly mounted via its actuator pivot to the disk base with the voice coil 32 positioned to move under/between the fixed magnet 34 in response to a voice coil control signal driven by the embedded circuit 500. The head stack assembly is also positioned so that at least one actuator arm 52 can move at least one head gimbal assembly 60 near a disk surface 120-1 as shown in FIGS. 3 and 4A.

A disk surface 120-1 rotates about a spindle 40 about the spindle axis 42 to create the rotating disk surface 120-1. The head stack assembly 50 pivots about the actuator pivot 58. The head stack assembly includes the actuator arm 52 coupled with the voice coil 32. When the voice coil is electrically stimulated with a time-varying electrical signal, it inductively interacts with a fixed magnet 34 attached to the voice coil yoke, causing the actuator arm to pivot by lever action through the actuator pivot. Typically, the fixed magnet is composed of two parts, one attached to the voice coil yoke and the other attached to the bottom voice coil yoke. As the actuator arm pivots, the head gimbal assembly 60 is moved across the disk surface 120-1. This provides the coarse positioning of the slider 90, and consequently, the read-write head 100 over a specific track.

FIG. 5 shows an exploded view of the primary components of the hard disk drive 10 including the voice coil motor 30. The hard disk drive further includes a disk base 14 to which the head stack assembly 50 is preferably mounted. The spindle motor 270 preferably drives the disk 12, and consequently the disk surface 120-1 through the spindle 40. The hard disk drive may further include a second rotating disk surface, to which a second actuator arm 52-2 may position a second head gimbal assembly 60-2. An embedded printed circuit board is used to control the positioning of the read-write head 100, possibly by also using a micro-actuator assembly, as well as the coarse positioning through the interactions with the voice coil 32, the fixed magnet 34 and the actuator arm 52 of the head stack assembly 50.

The preceding embodiments provide examples of the invention and are not meant to constrain the scope of the following claims.

What is claimed is:

1. A hard disk drive(10) comprising:
    a disk base(14);
    a disk pack(8) mounted to said disk base, comprising a spindle motor(270);
    a disk(12) coupled between a disk clamp(300) and said spindle motor by N screws(SL) through N screw holes (S) proceeding from a first clamping surface(322) to a second clamping surface(324), with said disk clamp including:
        a disk clamp base(320) and a disk clamp platform(330);
        wherein said disk clamp base(320) includes:
            i) said N of first screw holes proceeding from said first clamping surface for contacting a disk surface(120-1) on said disk to a second clamping surface for contacting said disk clamp platform, and
            ii) an upstanding abutment(320-1) which forms a cavity in an upper surface of said disk clamp base for positioning said disk clamp platform;
        wherein said disk clamp platform(330) includes:
            said N of second screw holes(S) proceeding from a first clamp platform surface for contacting said second clamping surface(332) to a second platform surface(334) for contacting said N of screws; and
        wherein said N is at least four.

2. The disk clamp for use in said hard disk drive of claim 1, comprising:
    said disk clamp base (320) and said disk clamp platform (330);
    wherein said disk clamp base, includes: said N of said first screw holes (S) proceeding
        from said first clamping surface (322) for contacting said disk surface (120-1) included in said disk (12)
        to said second clamping surface (324) for contacting said disk clamp platform; and
    wherein said disk clamp platform, includes: said N of said second screw holes (S) proceeding from said first platform surface (332) for contacting said second clamping surface to said second platform surface (334) for contacting said N of said screws.

3. The disk clamp of claim 2, wherein said disk clamp base is primarily composed of a first metal and said disk clamp platform is primarily composed of a second metal.

4. The disk claim of claim 3, wherein said first metal is a form of aluminum.

5. The disk clamp of claim 3, wherein said second metal is a form of stainless steel.

6. The disk clamp of claim 2, wherein said disk clamp base further includes a tab ramp (312R) for a contact start-stop mechanism.

7. The disk clamp of claim 2, further comprising: M plug holes (PH) in each of said disk clamp base and said disk clamp platform, wherein said M is at least four.

8. The disk clamp of claim 2, wherein said N is at least six.

9. A method of manufacturing said disk clamp base of claim 2, comprising the step:

forming with a first metal to create said disk clamp base, further comprises at least one member of the group consisting of the steps:

molding said first metal to create said disk clamp base;

stamping said first metal to create said disk clamp base; and machining said first metal to create said disk clamp base.

10. The disk clamp base as product of the process of claim 9.

11. A method of manufacturing said disk clamp platform of claim 2, comprising the step:

forming with a second metal to create said disk clamp platform, further comprising at least one member of the group consisting of the steps:

molding said second metal to create said disk clamp platform;

stamping said second metal to create said disk clamp platform; and machining said second metal to create said disk clamp platform.

12. The disk clamp platform as a product of the process of claim 11.

13. The hard disk drive of claim 1, wherein said hard disk drive implements a member of the group consisting of:

an outside diameter parking ramp; and a contact start-stop parking mechanism.

14. The disk pack for said hard disk drive of claim 1, comprising:

said disk coupled between said disk clamp and said spindle motor by said N of screws.

15. The disk pack of claim 14, further comprising: a second of said disks (12-2) coupling through a disk spacer (310) to said disk, wherein said second of said disks is also coupled between said disk clamp and said spindle motor.

16. A method of manufacturing said disk pack of claim 14, comprising the step:

coupling said disk between said disk clamp and said spindle motor by said N of said screws to create said disk pack.

17. The method of claim 16, further comprising the step: balancing said disk pack using at least one of M plug holes (PH) in each of said disk clamp base and said disk clamp platform to further create said disk pack.

18. The disk pack as a product of the process of claim 16.

19. A method of manufacturing said hard disk drive of claim 1, comprising the step:

mounting said disk pack to said disk base to create said hard disk drive.

20. The hard disk drive as a product of the process of claim 19.

* * * * *